United States Patent
Meyer et al.

(10) Patent No.: US 11,076,261 B1
(45) Date of Patent: Jul. 27, 2021

(54) LOCATION SYSTEMS FOR ELECTRONIC DEVICE COMMUNICATIONS

(71) Applicant: Apple Inc., Cupertino, CA (US)

(72) Inventors: Adam S. Meyer, Cupertino, CA (US); Duncan Robert Kerr, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/696,566

(22) Filed: Sep. 6, 2017

Related U.S. Application Data

(60) Provisional application No. 62/395,929, filed on Sep. 16, 2016.

(51) Int. Cl.
| | |
|---|---|
| *H04W 12/08* | (2009.01) |
| *H04W 4/02* | (2018.01) |
| *H04W 68/02* | (2009.01) |
| *H04W 76/14* | (2018.01) |
| *H04W 4/80* | (2018.01) |

(52) U.S. Cl.
CPC ............ *H04W 4/026* (2013.01); *H04W 68/02* (2013.01); *H04W 76/14* (2018.02); *H04W 4/80* (2018.02)

(58) Field of Classification Search
CPC .......... G01S 11/14; G01S 15/74; G01S 3/802; G01S 3/8083; G01S 5/0072; G01S 5/18; G01S 5/28
USPC .................. 455/41.1, 41.2, 41.3, 412.2, 400; 370/225, 329; 345/173
See application file for complete search history.

(56) References Cited

U.S. PATENT DOCUMENTS

| | | |
|---|---|---|
| 8,219,028 B1 | 7/2012 | Flamholz |
| 8,228,292 B1 * | 7/2012 | Ruiz ..................... G06F 1/1626 345/156 |
| 8,249,626 B2 | 8/2012 | Huston |
| 8,661,352 B2 | 2/2014 | Gronow et al. |
| 8,842,003 B2 | 9/2014 | Huston |
| 9,055,162 B2 | 6/2015 | Park et al. |

(Continued)

OTHER PUBLICATIONS

Fuentes-Pacheco, Jorge, et al., "Visual simultaneous localization and mapping: a survey", Spring Science + Business B.V., Dec. 2012, [Retrieved on Sep. 9, 2016], Retrieved from the Internet: <URL: https://www.researchgate.net/publication/234081012>.

(Continued)

*Primary Examiner* — Tan H Trinh
(74) *Attorney, Agent, or Firm* — Treyz Law Group, P.C.; Kendall W. Abbasi

(57) ABSTRACT

An electronic device may be provided with control circuitry, wireless transceiver circuitry, and a display. The control circuitry may determine where nearby devices are located relative to the electronic device. When a wireless communications link is established with a nearby device, the control circuitry may use the display to inform a user of the status of the wireless communications link and the location of the nearby device. The display may produce images such as a line extending in the direction of the nearby device. The line may move on the display in response to movement of the nearby device. In an environment with multiple devices that are in range for wireless communications, the display may show a notification for each nearby device. The location and size of each notification on the display may be based on the location and proximity of the nearby device.

22 Claims, 14 Drawing Sheets

(56) References Cited

U.S. PATENT DOCUMENTS

| | | | |
|---|---|---|---|
| 9,066,258 B2* | 6/2015 | Li | H04L 5/0064 |
| 9,232,353 B2* | 1/2016 | Bozarth | H04N 7/18 |
| 9,600,584 B2 | 3/2017 | Schloter | |
| 9,830,924 B1* | 11/2017 | Degges, Jr. | G10L 21/00 |
| 2002/0169539 A1* | 11/2002 | Menard | G01C 21/26 |
| | | | 701/532 |
| 2008/0039212 A1 | 2/2008 | Ahlgren | |
| 2009/0043504 A1* | 2/2009 | Bandyopadhyay | G01C 17/38 |
| | | | 701/469 |
| 2009/0305742 A1* | 12/2009 | Caballero | H04B 1/3838 |
| | | | 455/566 |
| 2010/0087144 A1 | 4/2010 | Korenshtein | |
| 2010/0160004 A1* | 6/2010 | Alameh | G06F 1/1626 |
| | | | 455/575.1 |
| 2011/0070825 A1 | 3/2011 | Griffin et al. | |
| 2011/0081923 A1 | 4/2011 | Forutanpour et al. | |
| 2011/0083111 A1* | 4/2011 | Forutanpour | H04W 4/21 |
| | | | 715/863 |
| 2011/0296508 A1* | 12/2011 | Os | G06F 21/445 |
| | | | 726/7 |
| 2012/0134282 A1* | 5/2012 | Tirronen | H04W 4/70 |
| | | | 370/252 |
| 2012/0258669 A1 | 10/2012 | Honkanen | |
| 2013/0111369 A1* | 5/2013 | Pasquero | G06F 3/0481 |
| | | | 715/761 |
| 2013/0111370 A1* | 5/2013 | Pasquero | H04W 4/21 |
| | | | 715/761 |
| 2013/0135196 A1* | 5/2013 | Park | G06F 3/01 |
| | | | 345/156 |
| 2013/0145287 A1 | 6/2013 | Jung et al. | |
| 2013/0154930 A1* | 6/2013 | Xiang | G06F 3/167 |
| | | | 345/158 |
| 2013/0169571 A1* | 7/2013 | Gai | G06F 3/03547 |
| | | | 345/173 |
| 2013/0170398 A1* | 7/2013 | Kwon | H04W 8/005 |
| | | | 370/255 |
| 2013/0198392 A1* | 8/2013 | Hymel | G06F 3/013 |
| | | | 709/227 |
| 2013/0201097 A1* | 8/2013 | Pasquero | G06F 3/0488 |
| | | | 345/156 |
| 2013/0225078 A1* | 8/2013 | Johansson | H04W 76/10 |
| | | | 455/41.2 |
| 2013/0231046 A1* | 9/2013 | Pope | G06K 9/00013 |
| | | | 455/41.1 |
| 2013/0324169 A1 | 12/2013 | Kamal et al. | |
| 2014/0087654 A1 | 3/2014 | Kiveisha et al. | |
| 2014/0152538 A1* | 6/2014 | Ham | G06F 3/012 |
| | | | 345/156 |
| 2014/0206288 A1 | 7/2014 | Liu et al. | |
| 2014/0247346 A1 | 9/2014 | Bozarth et al. | |
| 2014/0282103 A1* | 9/2014 | Crandall | H04L 65/403 |
| | | | 715/753 |
| 2014/0286133 A1* | 9/2014 | Li | G01S 5/186 |
| | | | 367/117 |
| 2014/0357189 A1* | 12/2014 | Thuroe | H04M 1/7253 |
| | | | 455/41.1 |
| 2014/0380187 A1* | 12/2014 | Gardenfors | G06F 3/017 |
| | | | 715/748 |
| 2015/0004945 A1* | 1/2015 | Steeves | H04W 4/12 |
| | | | 455/412.2 |
| 2015/0023267 A1* | 1/2015 | Lim | H04L 1/1854 |
| | | | 370/329 |
| 2015/0106175 A1* | 4/2015 | Kang | G06Q 30/0241 |
| | | | 705/14.4 |
| 2015/0163621 A1* | 6/2015 | Wang | H04W 4/80 |
| | | | 455/41.3 |
| 2015/0195789 A1* | 7/2015 | Yoon | G06F 3/0488 |
| | | | 345/173 |
| 2015/0199037 A1* | 7/2015 | Reunamaki | G06F 3/041 |
| | | | 345/173 |
| 2015/0215762 A1* | 7/2015 | Edge | H04W 8/005 |
| | | | 370/338 |
| 2015/0236922 A1 | 8/2015 | Xiong | |
| 2015/0279081 A1 | 10/2015 | Monk et al. | |
| 2015/0324163 A1* | 11/2015 | Kim | G09G 5/12 |
| | | | 345/2.3 |
| 2015/0358760 A1 | 12/2015 | Kehm | |
| 2015/0373091 A1 | 12/2015 | Sanghavi | |
| 2016/0037569 A1* | 2/2016 | Kim | H04W 76/14 |
| | | | 455/450 |
| 2016/0065638 A1* | 3/2016 | Liu | H04W 4/80 |
| | | | 370/310 |
| 2016/0095074 A1* | 3/2016 | Park | H04W 8/005 |
| | | | 370/350 |
| 2016/0112839 A1* | 4/2016 | Choi | H04W 4/023 |
| | | | 455/41.2 |
| 2016/0112860 A1* | 4/2016 | Sorrentino | H04W 8/005 |
| | | | 370/329 |
| 2016/0239142 A1* | 8/2016 | Kim | G06F 3/0416 |
| 2016/0257198 A1* | 9/2016 | Buttolo | B60K 35/00 |
| 2016/0260414 A1* | 9/2016 | Yang | G06F 3/0481 |
| 2016/0291141 A1* | 10/2016 | Han | G01S 5/0072 |
| 2016/0337863 A1* | 11/2016 | Robinson | H04W 12/08 |
| 2016/0337894 A1* | 11/2016 | Lim | H04W 28/0215 |
| 2016/0360343 A1 | 12/2016 | Shi | |
| 2016/0360344 A1 | 12/2016 | Shim | |
| 2017/0013592 A1* | 1/2017 | Nakano | H04W 16/14 |
| 2017/0150539 A1* | 5/2017 | Szeto | H04M 1/7253 |
| 2017/0251510 A1* | 8/2017 | Kitagawa | H04W 76/023 |
| 2017/0285788 A1* | 10/2017 | Park | H04L 67/06 |
| 2017/0338857 A1* | 11/2017 | Dobyns | H04W 4/80 |
| 2017/0338858 A1* | 11/2017 | Dobyns | H04W 4/80 |
| 2017/0372223 A1* | 12/2017 | Vaughn | G06N 99/005 |
| 2018/0110037 A1* | 4/2018 | Yasukawa | H04W 76/14 |
| 2018/0159616 A1* | 6/2018 | Aminaka | H04B 7/15 |
| 2018/0279099 A1* | 9/2018 | Novo Diaz | G06F 9/4498 |
| 2019/0378505 A1* | 12/2019 | Wang | G10L 15/22 |
| 2019/0380014 A1* | 12/2019 | Onishi | H04W 4/44 |
| 2020/0007988 A1* | 1/2020 | Raj | H04W 76/10 |

OTHER PUBLICATIONS

"Introduction to Real Time Location Systems", DecaWave, Application Note: APS003, 2014. p. 1-14, Dublin, Ireland.

"Sevenhugs Smart Remote: the Remote for Everything", Indiegogo, 25 pages, [Retrieved on Sep. 5, 2017], Retrieved rom the Internet: <URL:https://www.indiegogo.com/projects/sevenhugs-smart-remote-the-remote>.

"Ultra-Wideband Location", NIST, Dec. 15, 2009, 3 pages, [Retrieved on Sep. 5, 2017], Retrieved from the Internet: <URL: https://www.nist.gov/programs-projects/ultra-wideband-location>.

* cited by examiner

LOCATION SYSTEMS FOR ELECTRONIC DEVICE COMMUNICATIONS

This application claims the benefit of provisional patent application No. 62/395,929, filed Sep. 16, 2016, which is hereby incorporated by reference herein in its entirety.

BACKGROUND

This relates generally to electronic devices and, more particularly, to wireless electronic devices that use real time location systems.

Electronic devices often include wireless communications circuitry. For example, cellular telephones, computers, and other devices often contain antennas and wireless transceivers for supporting wireless communications.

Wireless electronic devices often communicate with other nearby wireless electronic devices. For example, a user may wirelessly share files with another nearby user over a short-range communications link such as Bluetooth® or WiFi®.

It can be challenging for a user to know when the device of another user is sufficiently close to establish a short-range wireless communications link. It can also be challenging to safely establish a communications link with the desired device when there are multiple devices within range. For example, when a user is in a public environment with a large number of unfamiliar devices, the user may have difficulty finding and selecting the desired device with which he or she desires to communicate wirelessly.

SUMMARY

An electronic device may be provided with wireless circuitry. The wireless circuitry may include one or more antennas. The antennas may include millimeter wave antenna arrays formed from arrays of millimeter wave antennas on millimeter wave antenna array substrates. The antennas may also include wireless local area network antennas, satellite navigation system antennas, cellular telephone antennas, and other antennas.

The electronic device may be provided with control circuitry and a display. The control circuitry may determine where nearby electronic devices are located relative to the electronic device. When a wireless communications link is established with a nearby device, the control circuitry may use the display to inform a user of the status of the wireless communications link and the location of the nearby device. The display may produce images that indicate where the nearby device is located such as a line extending in the direction of the nearby device. The line may move on the display in response to movement of the nearby device.

In an environment with multiple nearby devices that are in range for wireless communications, the display of an electronic device may show a notification for each nearby device. The location and size of each notification on the display may be based on the relative location and proximity of the associated nearby device. For example, larger notifications on the display may indicate a closer device, and a notification on the right hand side of the display may indicate the nearby device is on the right hand side of the electronic device.

The control circuitry may determine when the electronic device is oriented in a particular way relative to a nearby device. In response to determining that the electronic device is arranged end-to-end or side-to-side with another device, for example, the control circuitry may use wireless transceiver circuitry to automatically exchange information with the electronic device or may automatically prompt the user to indicate whether the user would like to exchange information with the electronic device.

DETAILED DESCRIPTION

In some wireless systems, the services that are provided may depend on the position of one node relative to another node in the network. For example, consider a scenario in which a user of a first wireless device wishes to share information with a user of a second wireless device. When the two devices are within an appropriate range of one another, a short-range communications link may be established and information may be exchanged over the communications link.

In this type of scenario, it may be desirable for a user to not only know when a wireless communications link has been established, but also to easily control which device he or she exchanges information with. For example, in a crowded room where multiple wireless communications devices are close enough to establish a communications link, it may be desirable for the user to be better informed of which devices are near the user, where the devices are located relative to the user, and whether and with whom a communications link has been established.

Figure 1:
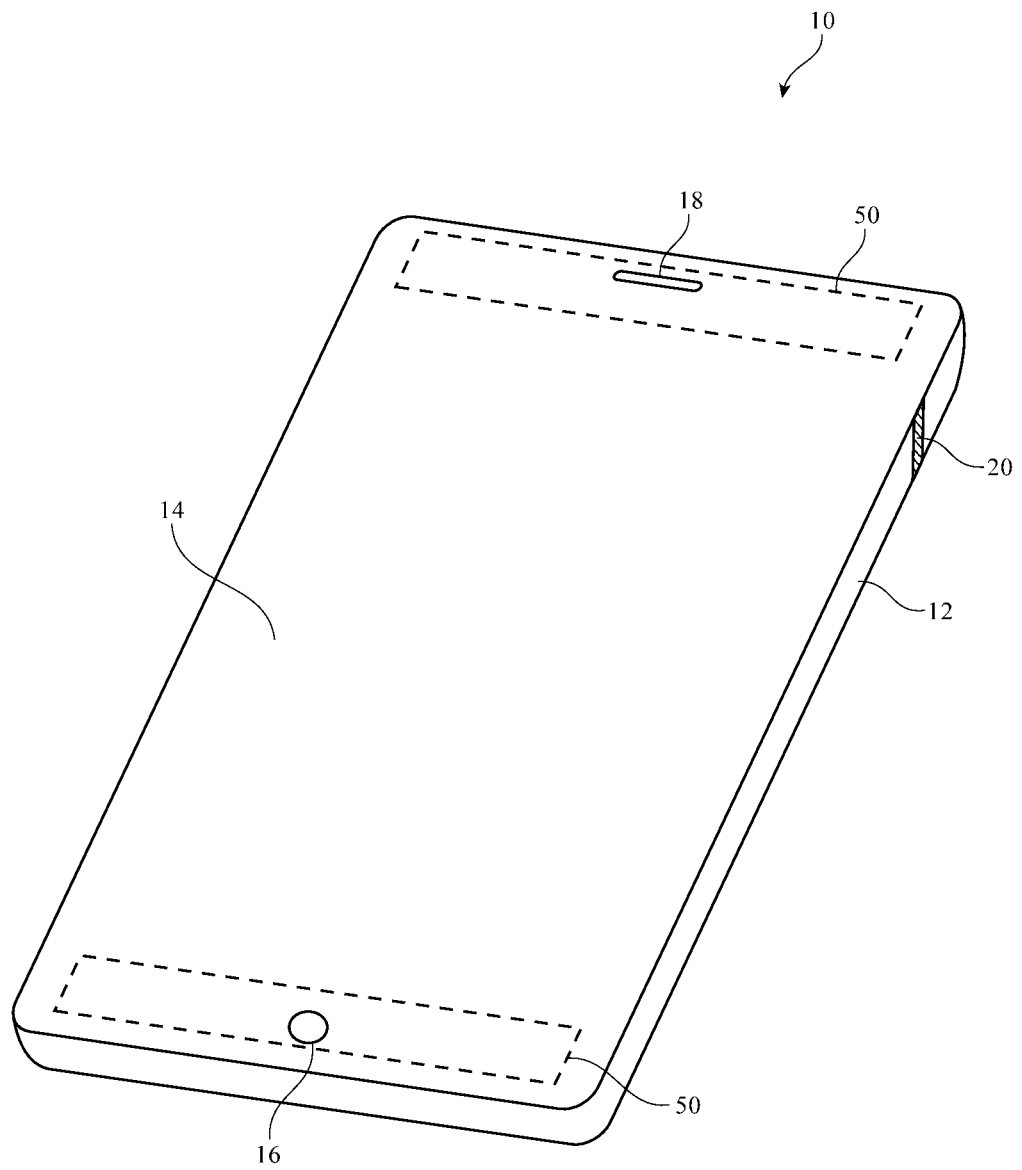
FIG. 1 is a perspective view of an illustrative electronic device with wireless communications circuitry and sensors in accordance with an embodiment.

An electronic device such as electronic device 10 of FIG. 1 may have control circuitry that determines where other objects or devices (sometimes referred to as nodes) are located relative to electronic device 10. The control circuitry in device 10 may synthesize information from cameras, motion sensors, wireless circuitry such as antennas, and other input-output circuitry to determine how far a node is relative to device 10 and to determine the orientation of device 10 relative to that node. The control circuitry may use output components in device 10 to provide output (e.g., display output, audio output, haptic output, or other suitable output) to a user of device 10 based on the position of the node.

Antennas in device 10 may include cellular telephone antennas, wireless local area network antennas (e.g., WiFi® antennas at 2.4 GHz and 5 GHz and other suitable wireless local area network antennas), satellite navigation system signals, and near-field communications antennas. The antennas may also include antennas for handling millimeter wave communications. For example, the antennas may include millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 10 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

As shown in FIG. 1, device 10 may include a display such as display 14. Display 14 may be mounted in a housing such as housing 12. For example, device 10 may have opposing front and rear faces and display 14 may be mounted in housing 12 so that display 14 covers the front face of device 10 as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). If desired, different portions of housing 12 may be formed from different materials. For example, housing sidewalls may be formed from metal and some or all of the rear wall of housing 12 may be formed from a dielectric such as plastic, glass, ceramic, sapphire, etc. Dielectric rear housing wall materials such as these may, if desired, by laminated with metal plates and/or other metal structures to enhance the strength of the rear housing wall (as an example).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels, an array of electrowetting pixels, or pixels based on other display technologies.

Display 14 may be protected using a display cover layer such as a layer of transparent glass, clear plastic, sapphire, or other transparent dielectric. Openings may be formed in the display cover layer. For example, an opening may be formed in the display cover layer to accommodate a button such as button 16. Buttons such as button 16 may also be formed from capacitive touch sensors, light-based touch sensors, or other structures that can operate through the display cover layer without forming an opening.

If desired, an opening may be formed in the display cover layer to accommodate a port such as speaker port 18. Openings may be formed in housing 12 to form communications ports (e.g., an audio jack port, a digital data port, etc.). Openings in housing 12 may also be formed for audio components such as a speaker and/or a microphone. Dielectric-filled openings 20 such as plastic-filled openings may be formed in metal portions of housing 12 such as in metal sidewall structures (e.g., to serve as antenna windows and/or to serve as gaps that separate portions of antennas from each other).

Antennas may be mounted in housing 12. If desired, some of the antennas (e.g., antenna arrays that may implement beam steering, etc.) may be mounted under dielectric portions of device 10 (e.g., portions of the display cover layer, portions of a plastic antenna window in a metal housing sidewall portion of housing 12, etc.). With one illustrative configuration, some or all of rear face of device 12 may be formed from a dielectric. For example, the rear wall of housing 12 may be formed from glass plastic, ceramic, other dielectric. In this type of arrangement, antennas may be mounted within the interior of device 10 in a location that allows the antennas to transmit and receive antenna signals through the rear wall of device 10 (and, if desired, through optional dielectric sidewall portions in housing 12). Antennas may also be formed from metal sidewall structures in housing 12 and may be located in peripheral portions of device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing, along the peripheral edges of housing 12, on the rear of housing 12, under the display cover layer that is used in covering and protecting display 14 on the front of device 10 (e.g., a glass cover layer, a sapphire cover layer, a plastic cover layer, other dielectric cover layer structures, etc.), under a dielectric window on a rear face of housing 12 or the edge of housing 12, under a dielectric rear wall of housing 12, or elsewhere in device 10. As an example, antennas may be mounted at one or both ends 50 of device 10 (e.g., along the upper and lower edges of housing 12, at the corners of housing 12, etc.).

Figure 2:
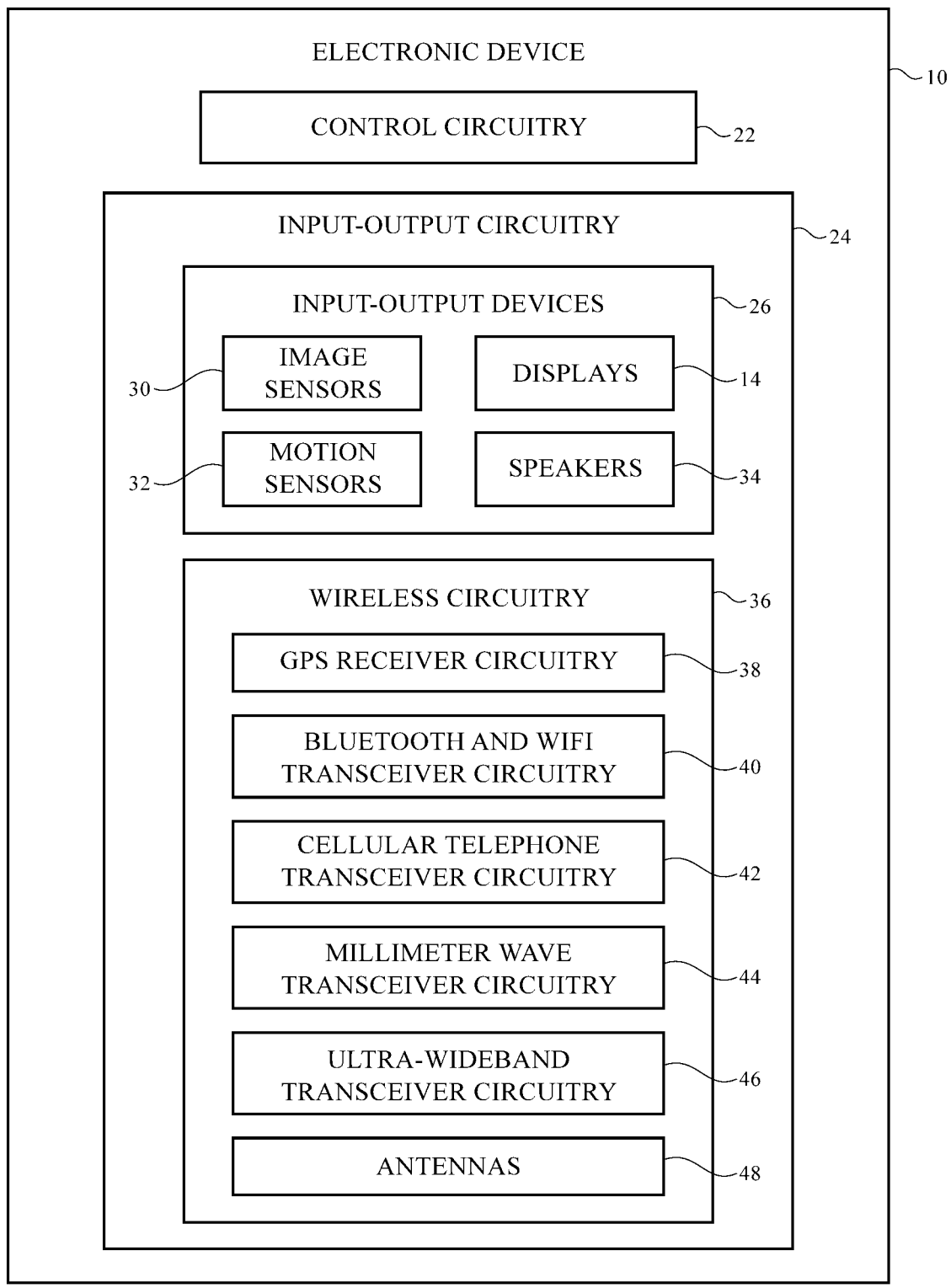
FIG. 2 is a schematic diagram of an illustrative electronic device with wireless communications circuitry and sensors in accordance with an embodiment.

A schematic diagram of illustrative components that may be used in device 10 is shown in FIG. 2. As shown in FIG. 2, device 10 may include storage and processing circuitry such as control circuitry 22. Control circuitry 22 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 22 may be used to control the operation of device 10. This processing circuitry may be based on one or more microprocessors, microcontrollers, digital signal processors, baseband processor integrated circuits, application specific integrated circuits, etc.

Control circuitry 22 may be used to run software on device 10, such as internet browsing applications, voice-over-internet-protocol (VOIP) telephone call applications, email applications, media playback applications, operating system functions, etc. To support interactions with external equipment, control circuitry 22 may be used in implementing communications protocols. Communications protocols that may be implemented using control circuitry 22 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, millimeter wave communications protocols, IEEE 802.15.4 ultra-wideband communications protocols, etc.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, and other input-output components. For example, input-output devices 26 may include one or more displays 14 (e.g., touch screens or displays without touch sensor capabilities), one or more image sensors 30 (e.g., digital image sensors), motion sensors 32, and speakers 34. Input-output devices 26 may also include buttons, joysticks, scrolling wheels, touch pads, key pads, keyboards, microphones, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Image sensors 30 may include one or more visible digital image sensors (visible-light cameras) and/or one or more infrared digital image sensors (infrared-light cameras). Image sensors 30 may, if desired, be used to measure distances. For example, an infrared time-of-flight image sensor may be used to measure the time that it takes for an infrared light pulse to reflect back from objects in the vicinity of device 10, which may in turn be used to determine the distance to those objects. Visible imaging systems such as a front and/or rear facing camera in device 10 may also be used to determine the position of objects in the environment. For example, control circuitry 22 may use image sensors 30 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 22 may rely entirely upon image sensors 30 to perform simultaneous localization and mapping, or control circuitry 22 may synthesize image data with range data from one or more distance sensors (e.g., light-based proximity sensors). If desired, control circuitry 22 may use display 14 to display a visual representation of the mapped environment.

Motion sensors 32 may include accelerometers, gyroscopes, magnetic sensors (e.g., compasses), and other sensor structures. Sensors 32 of FIG. 2 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Motion sensors 32 may include circuitry for detecting movement and orientation of device 10. Motion sensors that may be used in sensors 32 include accelerometers (e.g., accelerometers that measure acceleration along one, two, or three axes), gyroscopes, compasses, pressure sensors, other suitable types of motion sensors, etc. Storage and processing circuitry 22 may be used to store and process motion sensor data. If desired, motion sensors, processing circuitry, and storage that form motion sensor circuitry may form part of a system-on-chip integrated circuit (as an example).

Other sensors that may be included in input-output devices 26 include ambient light sensors for gathering information on ambient light levels, proximity sensor components (e.g., light-based proximity sensors, capacitive proximity sensors, and/or proximity sensors based on other structures).

Input-output circuitry 24 may include wireless communications circuitry 36 for communicating wirelessly with external equipment. Wireless communications circuitry 36 may include radio-frequency (RF) transceiver circuitry formed from one or more integrated circuits, power amplifier circuitry, low-noise input amplifiers, passive RF components, one or more antennas 48, transmission lines, and other circuitry for handling RF wireless signals. Wireless signals can also be sent using light (e.g., using infrared communications).

Wireless communications circuitry 36 may include radio-frequency transceiver circuitry for handling various radio-frequency communications bands. For example, circuitry 36 may include transceiver circuitry 40, 42, 44, and 46.

Transceiver circuitry 40 may be wireless local area network transceiver circuitry. Transceiver circuitry 40 may handle 2.4 GHz and 5 GHz bands for WiFi® (IEEE 802.11) communications and may handle the 2.4 GHz Bluetooth® communications band.

Circuitry 36 may use cellular telephone transceiver circuitry 42 for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry 42 may handle voice data and non-voice data.

Millimeter wave transceiver circuitry 44 (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry 44 may support IEEE 802.11ad communications at 60 GHz. Circuitry 44 may be formed from one or more integrated circuits (e.g., multiple integrated circuits mounted on a common printed circuit in a system-in-package device, one or more integrated circuits mounted on different substrates, etc.).

Ultra-wideband transceiver circuitry 46 may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry 46 may operate in a 2.4 GHz frequency band and/or at other suitable frequencies.

Wireless communications circuitry 36 may include satellite navigation system circuitry such as Global Positioning System (GPS) receiver circuitry 38 for receiving GPS signals at 1575 MHz or for handling other satellite positioning data (e.g., GLONASS signals at 1609 MHz). Satellite navigation system signals for receiver 38 are received from a constellation of satellites orbiting the earth.

In satellite navigation system links, cellular telephone links, and other long-range links, wireless signals are typically used to convey data over thousands of feet or miles. In WiFi® and Bluetooth® links at 2.4 and 5 GHz and other short-range wireless links, wireless signals are typically used to convey data over tens or hundreds of feet. Extremely high frequency (EHF) wireless transceiver circuitry 44 may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless communications circuitry 36 can include circuitry for other short-range and long-range wireless links if desired. For example, wireless communications circuitry 36 may include circuitry for receiving television and radio signals, paging system transceivers, near field communications (NFC) circuitry, etc.

Antennas 48 in wireless communications circuitry 36 may be formed using any suitable antenna types. For example, antennas 48 may include antennas with resonating elements that are formed from loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. If desired, one or more of antennas 48 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 48 can be configured to receive both satellite navigation system signals and signals for other communications bands (e.g., wireless local area network signals and/or cellular telephone signals). Antennas 48 can include phased antenna arrays for handling millimeter wave communications.

In configurations for device 10 in which housing 12 has portions formed from metal, openings may be formed in the metal portions to accommodate antennas 48. For example, openings in a metal housing wall may be used in forming splits (gaps) between resonating element structures and ground structures in cellular telephone antennas. These openings may be filled with a dielectric such as plastic. As shown in FIG. 1, for example, a portion of plastic-filled opening 20 may run up one or more of the sidewalls of housing 12.

Figure 3:
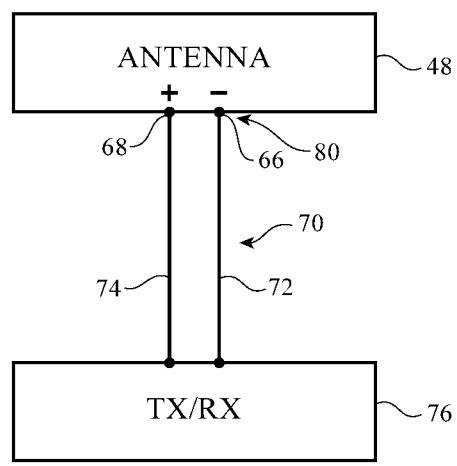
FIG. 3 is a diagram of an illustrative transceiver circuit and antenna in accordance with an embodiment.

A schematic diagram of a millimeter wave antenna or other antenna 48 coupled to transceiver circuitry 76 (e.g., wireless local area network transceiver circuitry 40, cellular telephone transceiver circuitry 42, millimeter wave transceiver circuitry 44, ultra-wideband transceiver circuitry 46, and/or other transceiver circuitry in wireless circuitry 36) is shown in FIG. 3. As shown in FIG. 3, radio-frequency transceiver circuitry 76 may be coupled to antenna feed 80 of antenna 48 using transmission line 70. Antenna feed 80 may include a positive antenna feed terminal such as positive antenna feed terminal 68 and may have a ground antenna feed terminal such as ground antenna feed terminal 66. Transmission line 70 may be formed from metal traces on a printed circuit or other conductive structures and may have a positive transmission line signal path such as path 74 that is coupled to terminal 68 and a ground transmission line signal path such as path 72 that is coupled to terminal 66. Transmission line paths such as path 70 may be used to route antenna signals within device 10. For example, transmission line paths may be used to couple antenna structures such as one or more antennas in an array of antennas to transceiver circuitry 76. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within transmission line 70 and/or circuits such as these may be incorporated into antenna 48 (e.g., to support antenna tuning, to support operation in desired frequency bands, etc.).

If desired, signals for millimeter wave antennas may be distributed within device 10 using intermediate frequencies (e.g., frequencies of about 5-15 GHz rather than 60 Hz). The intermediate frequency signals may, for example, be distributed from a baseband processor or other wireless communications circuit located near the middle of device 10 to one or more arrays of millimeter wave antennas at the corners of device 10. At each corner, upconverter and downconverter circuitry may be coupled to the intermediate frequency path. The upconverter circuitry may convert received intermediate frequency signals from the baseband processor to millimeter wave signals (e.g., signals at 60 GHz) for transmission by a millimeter wave antenna array. The downconverter circuitry may downconvert millimeter wave antenna signals from the millimeter wave antenna array to intermediate frequency signals that are then conveyed to the baseband processor over the intermediate frequency path.

Device 10 may contain multiple antennas 48. The antennas may be used together or one of the antennas may be switched into use while other antenna(s) are switched out of use. If desired, control circuitry 22 may be used to select an optimum antenna to use in device 10 in real time and/or to select an optimum setting for adjustable wireless circuitry associated with one or more of antennas 48. Antenna adjustments may be made to tune antennas to perform in desired frequency ranges, to perform beam steering with a phased antenna array, and to otherwise optimize antenna performance. Sensors may be incorporated into antennas 48 to gather sensor data in real time that is used in adjusting antennas 48.

In some configurations, antennas 48 may include antenna arrays (e.g., phased antenna arrays to implement beam steering functions). For example, the antennas that are used in handling millimeter wave signals for extremely high frequency wireless transceiver circuits 44 may be implemented as phased antenna arrays. The radiating elements in a phased antenna array for supporting millimeter wave communications may be patch antennas, dipole antennas, dipole antennas with directors and reflectors in addition to dipole antenna resonating elements (sometimes referred to as Yagi antennas or beam antennas), or other suitable antenna elements. Transceiver circuitry can be integrated with the phased antenna arrays to form integrated phased antenna array and transceiver circuit modules.

Figure 4:
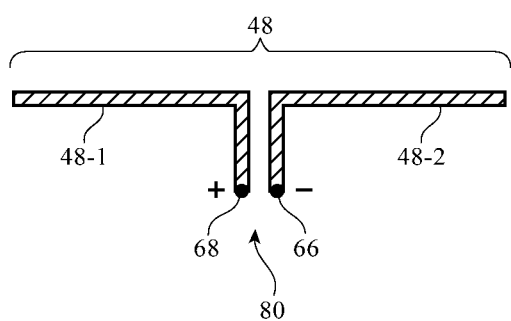
FIG. 4 is a diagram of an illustrative dipole antenna in accordance with an embodiment.

An illustrative dipole antenna is shown in FIG. 4. As shown in FIG. 4, dipole antenna 48 may have first and second arms such as arms 48-1 and 48-2 and may be fed at antenna feed 80. If desired, a dipole antenna such as dipole antenna 48 of FIG. 4 may be incorporated into a Yagi antenna (e.g., by incorporating a reflector and directors into dipole antenna 48 of FIG. 4).

Figure 5:
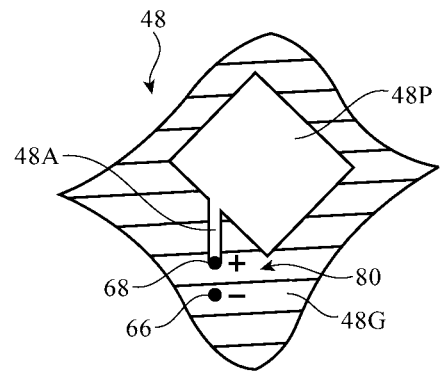
FIG. 5 is a perspective view of an illustrative patch antenna that may be used in an electronic device in accordance with an embodiment.

An illustrative patch antenna is shown in FIG. 5. As shown in FIG. 5, patch antenna 48 may have a patch antenna resonating element 48P that is separated from and parallel to a ground plane such as antenna ground plane 48G. Arm 48A may be coupled between patch antenna resonating element 48P and positive antenna feed terminal 68 of antenna feed 80. Ground antenna feed terminal 66 of feed 80 may be coupled to ground plane 48G.

Antennas of the types shown in FIGS. 4 and 5 and/or other antennas 48 may be used in forming millimeter wave antennas. The examples of FIGS. 4 and 5 are merely illustrative.

Figure 6:
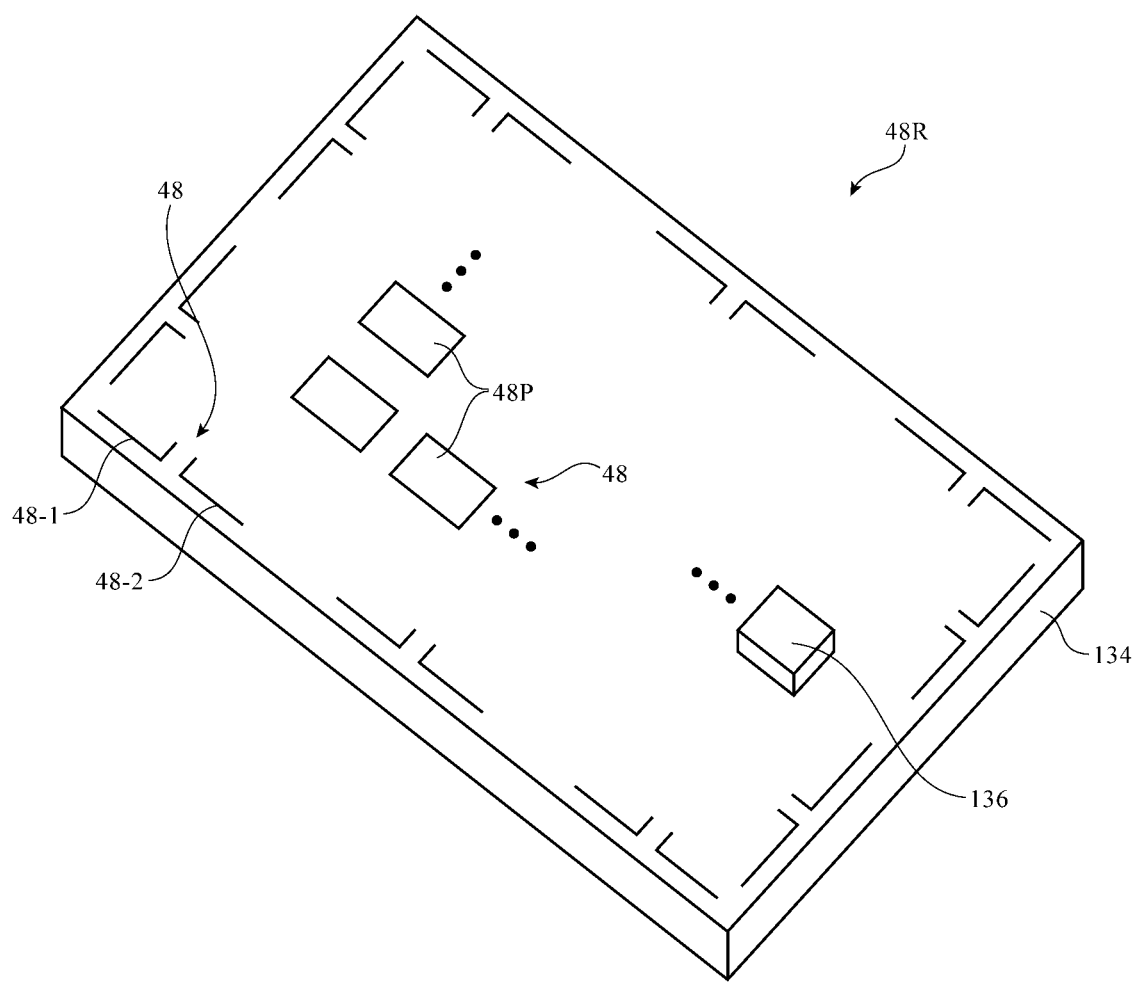
FIG. 6 is a perspective view of an illustrative array of millimeter wave antennas on a millimeter wave antenna array substrate in accordance with an embodiment.

FIG. 6 is a perspective view of an illustrative millimeter wave antenna array 48R formed from antenna resonating elements on millimeter wave antenna array substrate 134. Array 48R may include an array of millimeter wave antennas such as patch antennas 48 formed from patch antenna resonating elements 48P and dipole antennas 48 formed from arms 48-1 and 48-2. With one illustrative configuration, dipole antennas 48 may be formed around the periphery of substrate 134 and patch antennas 48 may form an array on the central surface of substrate 134. There may be any suitable number of millimeter wave antennas 48 in array 48R. For example, there may be 10-40, 32, more than 5, more than 10, more than 20, more than 30, fewer than 50, or other suitable number of millimeter wave antennas (patch antennas and/or dipole antennas, etc.). Substrate 134 may be formed from one or more layers of dielectric (polymer, ceramic, etc.) and may include patterned metal traces for forming millimeter wave antennas and signal paths. The signals paths may couple the millimeter wave antennas to circuitry such as one or more electrical devices 136 mounted on substrate 134. Device(s) 136 may include one or more integrated circuits, discrete components, upconverter circuitry, downconverter circuitry, (e.g., upconverter and downconverter circuitry that forms part of a transceiver), circuitry for adjusting signal amplitude and/or phase to perform beam steering, and/or other circuitry for operating antenna array 48R.

Figure 7:
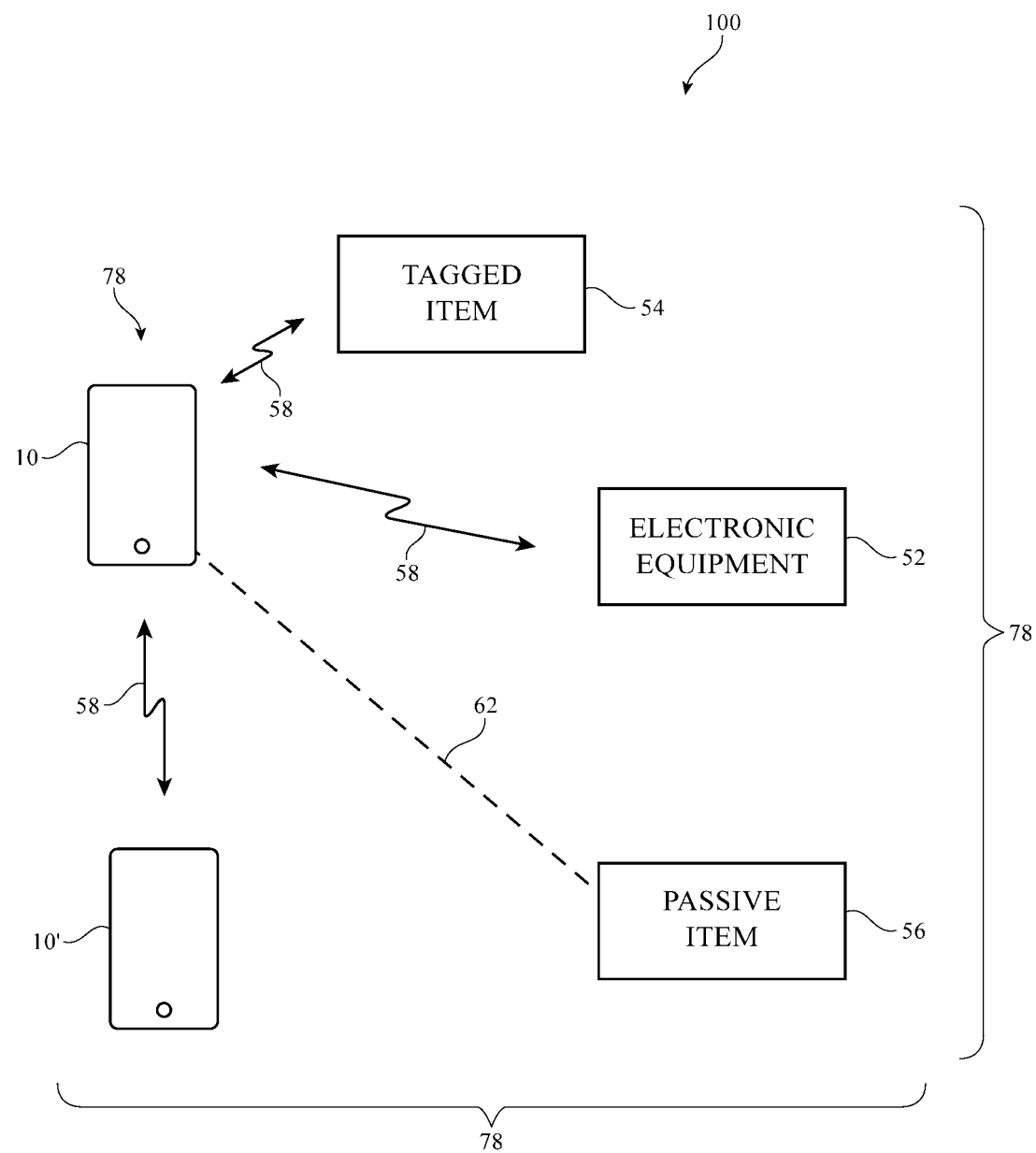
FIG. 7 is a diagram of an illustrative network having nodes in accordance with an embodiment.

FIG. 7 is a diagram of an illustrative network of objects that electronic device 10 may recognize and/or communicate wirelessly with. Network 100 may include nodes 78. Nodes 78 may be passive or active. Active nodes in network 100 may include devices that are capable of receiving and/or transmitting wireless signals such as signals 58. Active nodes in network 100 may include tagged devices such as tagged item 54, electronic equipment such as electronic equipment 52, and other electronic devices such as electronic devices 10' (e.g., devices having some or all of the same wireless communications capabilities as device 10). Tagged item 54 may be any suitable object that has been provided with a wireless receiver and/or a wireless transmitter. For example, tagged device 54 may be a key fob, a cellular telephone, a wallet, a laptop, a book, a pen, or other object that has been provided with a low-power transmitter (e.g., an RFID transmitter or other transmitter). Device 10 may have a corresponding receiver that detects the transmitted signals 58 from device 54 and determines the location of device 54 based on the received signals. Tagged device 54 may be passive (e.g., may not include an internal power source and may instead be powered by electromagnetic energy from device 10 or other device) or may be active (e.g., may include an internal power source).

Electronic equipment 52 may be an infrastructure-related device such as a thermostat, a smoke detector, a Bluetooth® Low Energy (Bluetooth LE) beacon, a WiFi® wireless access point, a server, a heating, ventilation, and air conditioning (HVAC) system (sometimes referred to as a temperature-control system), a light source such as a light-emitting diode (LED) bulb, a light switch, a power outlet, an occupancy detector (e.g., an active or passive infrared light detector, a microwave detector, etc.), a door sensor, a moisture sensor, an electronic door lock, a security camera, or other device.

Device 10 may communicate with communicate with nodes 54, 52, and 10' using communications signals 58. Communications signals 58 may include Bluetooth® signals, near-field communications signals, wireless local area signals such as IEEE 802.11 signals, millimeter wave communication signals such as signals at 60 GHz, ultra-wideband radio frequency signals, other radio-frequency wireless signals, infrared signals, etc. Wireless signals 58 may be used to convey information such as location and orientation information. For example, control circuitry 22 in device 10 may determine the location of active nodes 54, 52, and 10' relative to device 10 using wireless signals 58. Control circuitry 22 may also use image data from image sensors 30, motion sensor data from motion sensors 32, and other sensor data (e.g., proximity data from a proximity sensor, etc.) to determine the location of active nodes 54, 52, and 10'.

Passive nodes in network 100 such as passive object 56 may include objects that do not emit or receive radio-frequency signals such as furniture, buildings, doors, windows, walls, people, pets, and other items. Item 56 may be a tagged item that device 10 recognizes through feature tracking (e.g., using image sensor 30) or item 56 may be a virtually marked space that device 10 has assigned a set of coordinates to. For example, control circuitry 22 may construct a virtual three-dimensional space and may assign objects in the vicinity of device 10 coordinates in the virtual three-dimensional space based on their locations relative to device 10. In some arrangements, the virtual three-dimensional space may be anchored by one or more items with a known location (e.g., may be anchored by one or more tagged items 54 having a known location, electronic equipment 52 having a known location, or other items with a known location). Device 10 may then "tag" passive items such as item 56 by recording where passive item 56 is located relative to the anchored items in network 100. Device 10 may remember the virtual coordinates of passive item 56 and may take certain actions when device 10 is in a certain location or orientation relative to item 56. For example, if a user points device 10 in direction 62, control circuitry 10 may recognize that device 10 is being pointed at item 56 and may take certain actions (e.g., may display information associated with item 56 on display 14, may provide audio output via speakers 34, may provide haptic output via a vibrator in device 10, and/or may take other suitable action). Because passive item 56 does not send or receive communication signals, circuitry 22 may use image data from image sensors 30, motion sensor data from motion sensors 32, and other sensor data (e.g., proximity data from a proximity sensor, etc.) to determine the location of passive item 56 and/or to determine the orientation of device 10 relative to item 56 (e.g., to determine when device 10 is being pointed at item 56).

Figure 8:
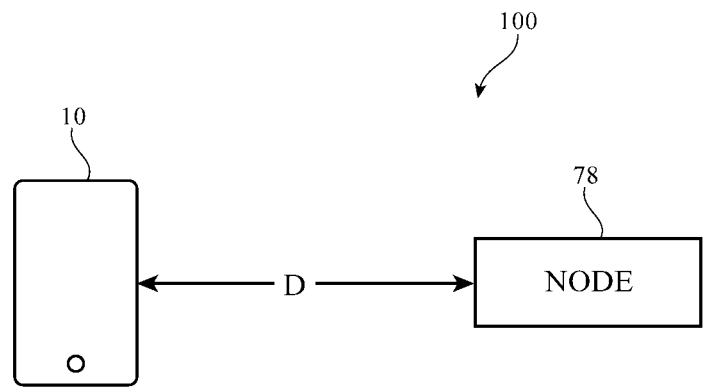
FIG. 8 is a diagram illustrating how a distance between an illustrative electronic device and a node in a network may be determined in accordance with an embodiment.

FIG. 8 shows how device 10 may determine a distance D between device 10 and node 78. In arrangements where node 78 is capable of sending or receiving communications signals (e.g., tagged item 54, electronic equipment 52, or other electronic devices 10' of FIG. 7), control circuitry 22 may determine distance D using communication signals (e.g., signals 58 of FIG. 7). Control circuitry 22 may determine distance D using signal strength measurement schemes (e.g., measuring the signal strength of radio signals from node 78) or using time based measurement schemes such as time of flight measurement techniques, time difference of arrival measurement techniques, angle of arrival measurement techniques, triangulation methods, time-of-flight methods, using a crowdsourced location database, and other suitable measurement techniques. This is merely illustrative, however. If desired, control circuitry 22 may determine distance D using Global Positioning System receiver circuitry 38, using proximity sensors (e.g., infrared proximity sensors or other proximity sensors), using image data from camera 30, motion sensor data from motion sensors 32, and/or using other circuitry in device 10.

In arrangements where node 78 is a passive object that does not send or receive wireless communications signals, control circuitry 22 may determine distance D using proximity sensors (e.g., infrared proximity sensors or other proximity sensors), using image data from camera 30, and/or using other circuitry in device 10. In some arrangements, device 10 may "tag" passive items by recording where passive item 56 is located relative to other items in network 100. By knowing the location of item 56 relative to anchored nodes in network 100 and knowing the location of the anchored nodes relative to device 10, device 10 can determine the distance D between device 10 and node 78.

Figure 9:
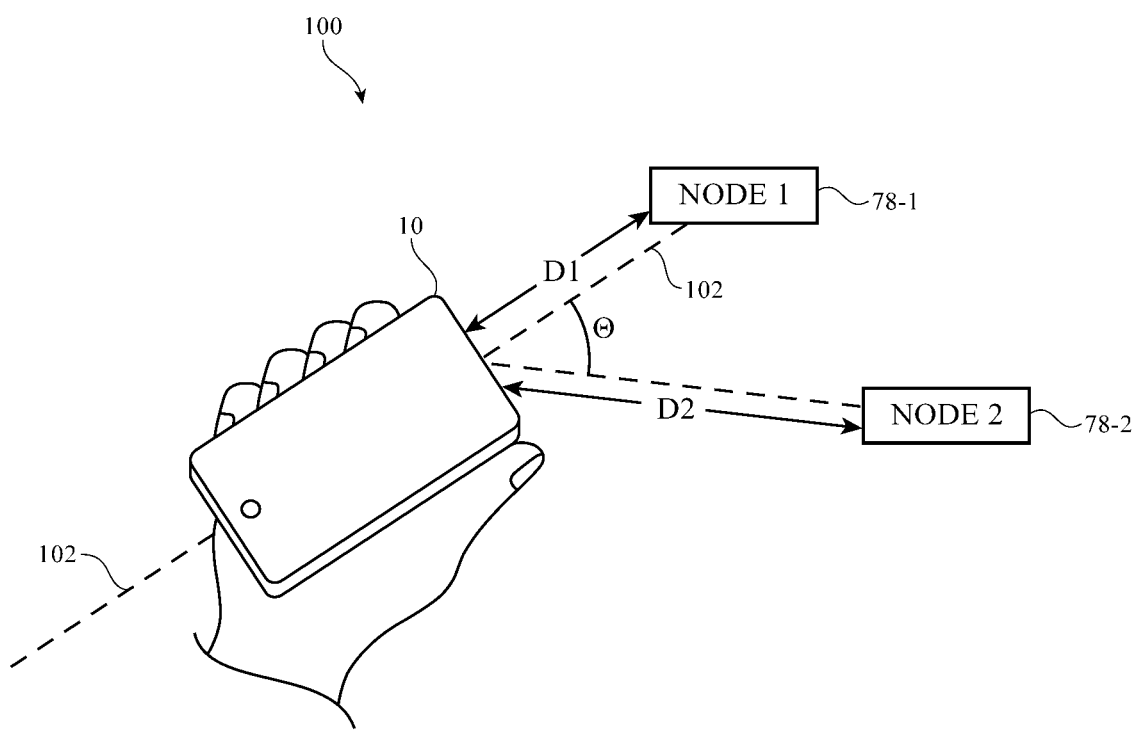
FIG. 9 is a diagram showing how a location and orientation of an illustrative electronic device relative to nodes in a network may be determined in accordance with an embodiment.

In addition to determining the distance between device 10 and nodes 78 in network 100, control circuitry 22 may be configured to determine the orientation of device 10 relative to nodes 78. As shown in FIG. 9, for example, device 10 may have a longitudinal axis such as longitudinal axis 102 that runs lengthwise down the center of device 10. Control circuitry 22 may be configured to determine where nodes 78 are located relative to longitudinal axis 102. For example, control circuitry 22 may determine that a first node such as node 78-1 at distance D1 from device 10 is located within the line of sight of longitudinal axis 102, while a second node such as node 78-2 at distance D2 is located at angle θ relative to longitudinal axis 102. Control circuitry 22 may determine this type of orientation information using wireless communications signals (e.g., signals 58 of FIG. 7), using proximity sensors (e.g., infrared proximity sensors or other proximity sensors), motion sensor data from motion sensors 32 (e.g., data from an accelerometer, a gyroscope, a compass, or other suitable motion sensor), using image data from camera 30, and/or using other circuitry in device 10.

If desired, other axes may be used to determine the orientation of device 10 relative to other nodes 78. For example, control circuitry 22 may determine where nodes 78 are located relative to a horizontal axis that is perpendicular to longitudinal axis 102. This may be useful in determining when nodes 78 are next to a side portion of device 10 (e.g., for determining when device 10 is oriented side-to-side with one of nodes 78).

After determining the orientation of device 10 relative to nodes 78-1 and 78-2, control circuitry 22 may take suitable action. For example, in response to determining that node 78-1 is in the line of sight of axis 102 (or within a given range of axis 102), control circuitry 22 may send information to node 78-1, may request and/or receive information from 78-1, may use display 14 to display a visual indication of wireless pairing with node 78-1, may use speakers 34 to generate an audio indication of wireless pairing with node 78-1, may use a vibrator or other mechanical element to generate haptic output indicating wireless pairing with node 78-1, and/or may take other suitable action.

In response to determining that node 78-2 is located at angle θ relative to axis 102, control circuitry 22 may use display 14 to display a visual indication of the location of node 78-2 relative to device 10, may use speakers 34 to generate an audio indication of the location of node 78-2, may use a vibrator or other mechanical element to generate haptic output indicating the location of node 78-2, and/or may take other suitable action.

Figure 10:
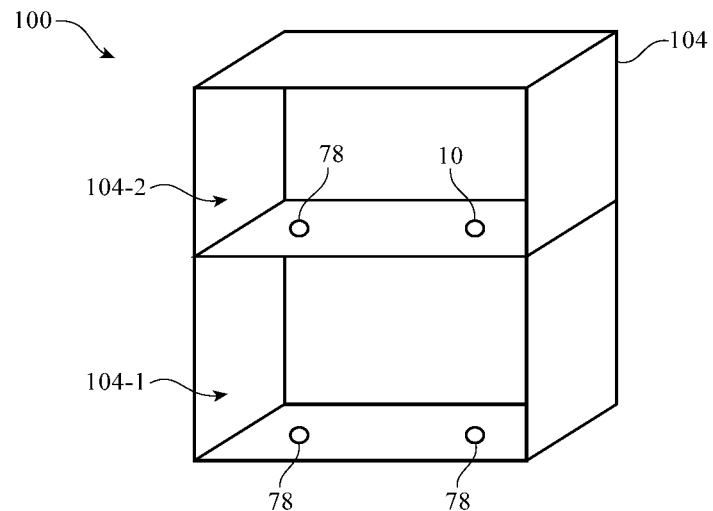
FIG. 10 is a perspective view of an illustrative scene in which the location and orientation of a node relative to other nodes in a network may be determined in accordance with an embodiment.

FIG. 10 illustrates a scenario in which the locations of nodes 78 are determined relative to other nodes 78 in network 100. In this type of scenario, device 10 does not know the absolute location of nodes 78 in network 100. However, control circuitry 22 may determine the relative location of nodes 78 using signal strength measurement schemes (e.g., measuring the signal strength of radio signals from nodes 78) or using time based measurement schemes such as time of flight measurement techniques, time difference of arrival measurement techniques, angle of arrival measurement techniques, triangulation methods, time-of-flight methods, using a crowdsourced location database, and other suitable measurement techniques. For example, device 10 on second floor 104-2 of building 104 may determine that one node 78 is directly below it on first floor 104-1 of building 104 and that another node 78 is located on the same floor as device 10 at a certain distance away.

Figure 11:
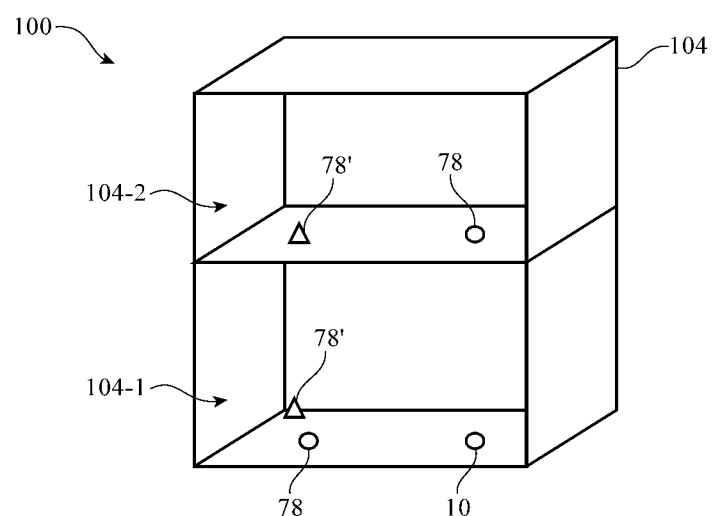
FIG. 11 is a perspective view of an illustrative scene in which the absolute location and orientation of a node may be determined using anchored nodes in a network in accordance with an embodiment.

FIG. 11 illustrates a scenario in which the absolute locations of nodes 78 are determined using anchored nodes 78' in network 100. In this type of arrangement, device 10 knows the locations (e.g., geographic coordinates) of anchored nodes 78' (e.g., a wireless access point, a beacon, or other electronic equipment 52, a tagged item 54 with a known location, etc.) and uses this information to determine the absolute location of nodes 78 (e.g., nodes with unknown locations). Thus, in addition to determining that one of nodes 78 is directly above device 10, control circuitry 22 may determine the absolute location of nodes 78 (e.g., the geographic coordinates of nodes 78).

Control circuitry 22 may use one or more output devices in device 10 to provide information on nearby nodes 78 to a user of device 10. The information may include, for example, how many nodes 78 are nearby, how close nodes 78 are to device 10, where nodes 78 are located in relation to device 10, whether or not a wireless communications link has been established or can be established, the type of information that device 10 can send to or receive from nodes 78, and/or other suitable information. Control circuitry 22 may provide this type of information to a user with images on display 14, audio from speakers 34, haptic output from a vibrator or other haptic element, light from a light source such as a status indicator, and/or other output components in device 10.

Figure 12:
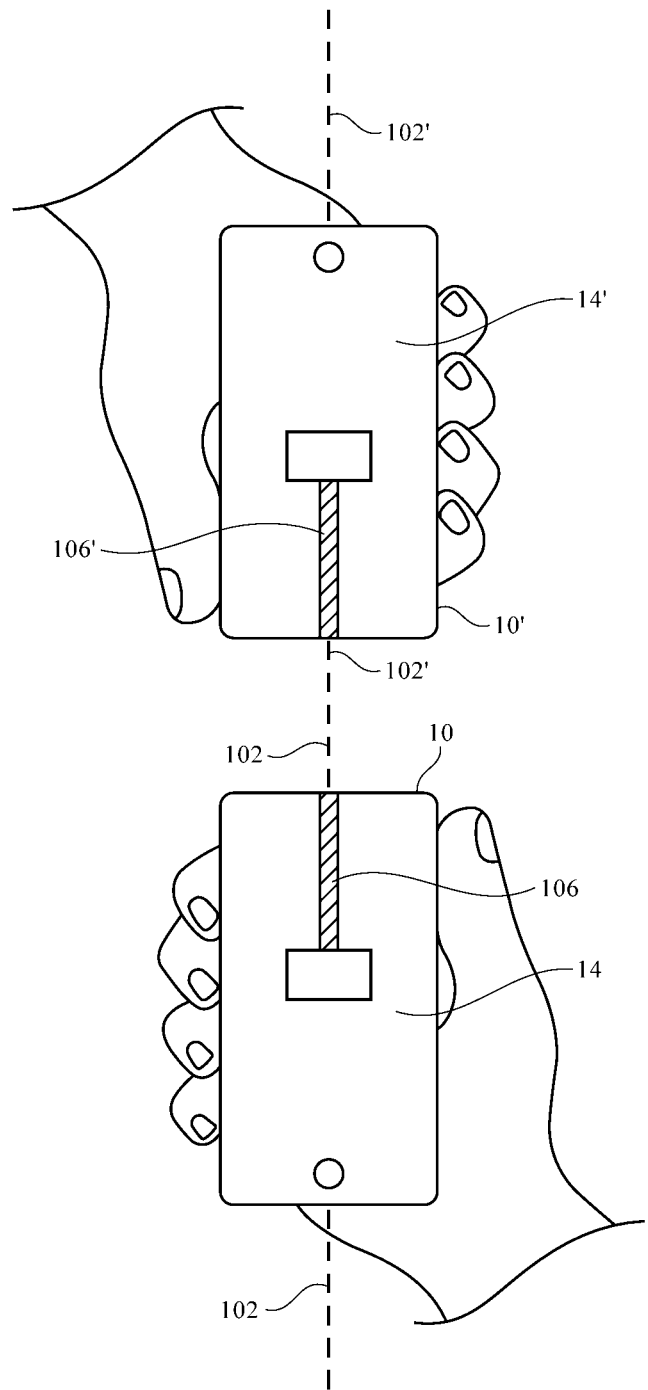
FIG. 12 is a top view of illustrative electronic devices showing how each user may be informed of an established wireless communications link in accordance with an embodiment.

It may be desirable for a user to know when and with what device a wireless communications link has been established. FIG. 12 illustrates an example in which control circuitry uses display 14 to produce a visual representation of a wireless communications link that has been established between device 10 and device 10'. In this example, display 14 displays a tether such as tether 106 that appears to physically link device 10' to device 10. Tether 106 may be an image of a line, rope, chain, cord, pattern (e.g., dots, lines, circles, etc.), or other display object that is aligned toward device 10'. Device 10' may generate a similar image such as tether 106'. Tether 106 and 106' may point toward one another to give the appearance of a physical string between device 10' and device 10. If desired, tether 106 and tether 106' may extend to the edge of displays 14 and 14', respectively, or tether 106 and 106' may stop short of the edge of displays 14 and 14'. respectively.

Control circuitry 22 may produce tether 106 when device 10 comes within a certain distance of device 10' and/or when device 10 is oriented at a given angle with respect to device 10'. Control circuitry 22 may, for example, determine the angle between longitudinal axis 102 of device 10 and longitudinal axis 102' of device 10'. When control circuitry 22 detects that longitudinal axis 102 aligns with longitudinal axis 102 (e.g., when a user points the top end of device 10 at device 10') and that device 10' is within a given distance of device 10 (e.g., 10 feet, 20 feet, 30 feet, 50 feet, more than 50 feet, less than 50 feet, or other threshold distance), control circuitry 22 may display a visual indication of the wireless connection (e.g., a wireless communications link) that can be or has been established between device 10 and device 10'.

Figure 13:
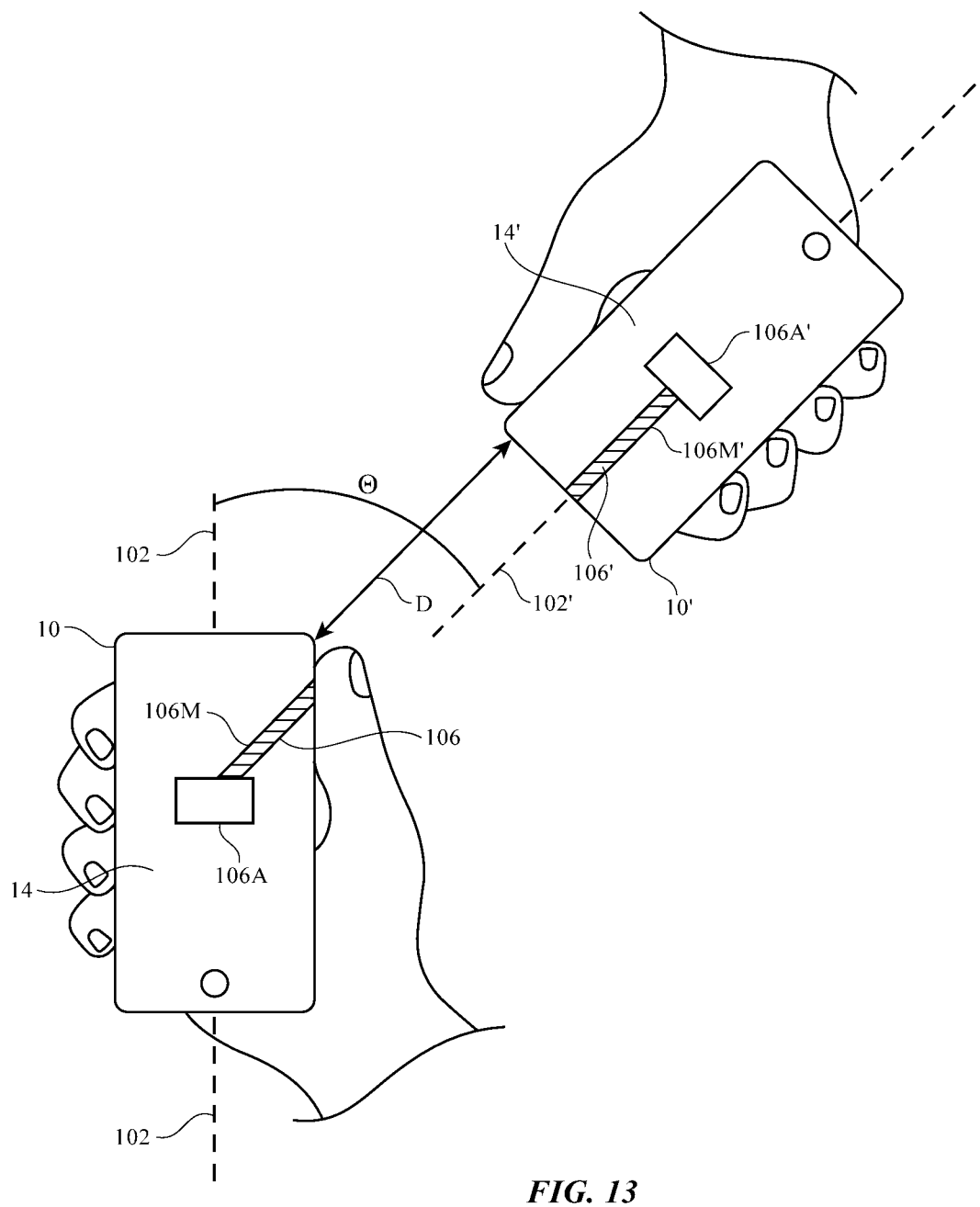
FIG. 13 is a top view of illustrative electronic devices showing how each user may be informed of the location and orientation of the other user's electronic device when a wireless communications link is established in accordance with an embodiment.

Device 10 need not directly point at device 10' in order to establish a wireless communications link with device 10'. FIG. 13 illustrates an example in which longitudinal axis 102 of device 10 and longitudinal axis 102' of device 10' are separated by angle θ. When angle θ is less than a predetermined threshold and distance D is less than a predetermined threshold, control circuitry 22 may display a visual indication of the wireless link that can be or has been established between devices 10 and 10'.

If desired, the visual indication such as tether 106 may change according to where and how devices 10 and 10' are located and oriented relative to one another. As shown in FIG. 13, for example, the location of tether 106 and 106' may change according to where devices 10 and 10' are located relative to one another. Tether 106 may have an anchored portion such as anchored portion 106A and a moveable portion such as portion 106M. Moveable portion 106M may rotate around anchored portion 106A based on where device 10' is located. Similarly, tether 106' may have a moveable portion 106M' that rotates around an anchored portion 106A' based on where device 10 is located. This not only informs the user of when a wireless connection is established, but it also informs the user of where device 10' is located relative to device 10, which can help avoid unintended connections with other devices in the vicinity of device 10.

Figure 14:
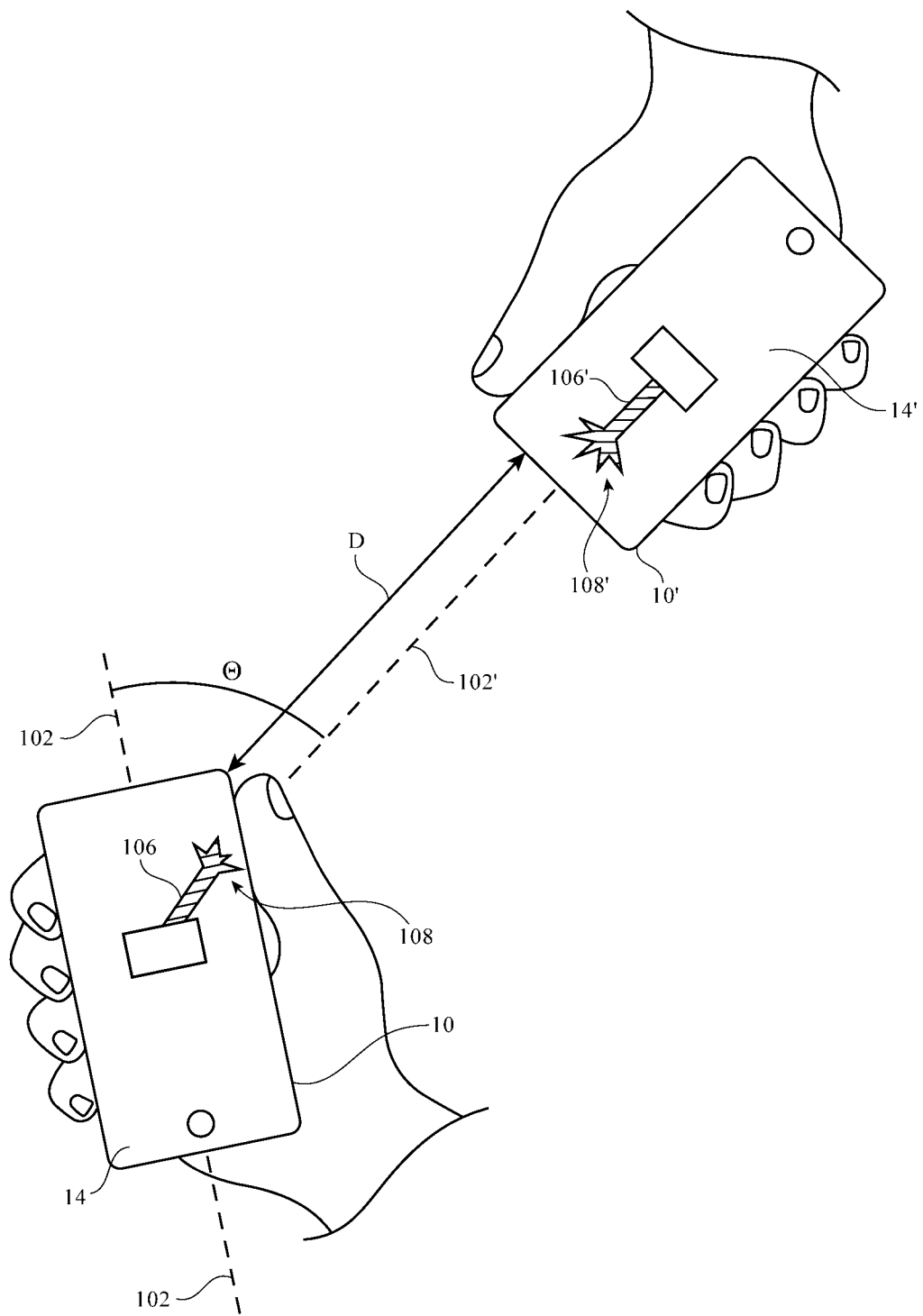
FIG. 14 is a top view of illustrative electronic devices showing how each user may be informed of a broken wireless communications link in accordance with an embodiment.

FIG. 14 shows how control circuitry 22 may use display 14 to provide a visual indication of a broken or inactive communications link. When control circuitry 22 detects that the distance D between devices 10 and 10' exceeds a predetermined threshold distance or that angle θ exceeds a predetermined threshold angle, control circuitry 22 may break the wireless communications link between devices 10 and 10' (or this may occur automatically if the wireless connection is too weak). In the example of FIG. 14, display 14 shows a broken end such as broken end 108 on tether 106. Likewise, display 14' may show broken end 108' on tether 106'. This helps inform the user of that the wireless communications link between device 10 and device 10' is no longer established. The example of a broken or torn end of a tether is merely illustrative. In general, display 14 may generate any suitable visual indication to show the user that device 10 is no longer wirelessly paired with device 10'.

Figure 15:
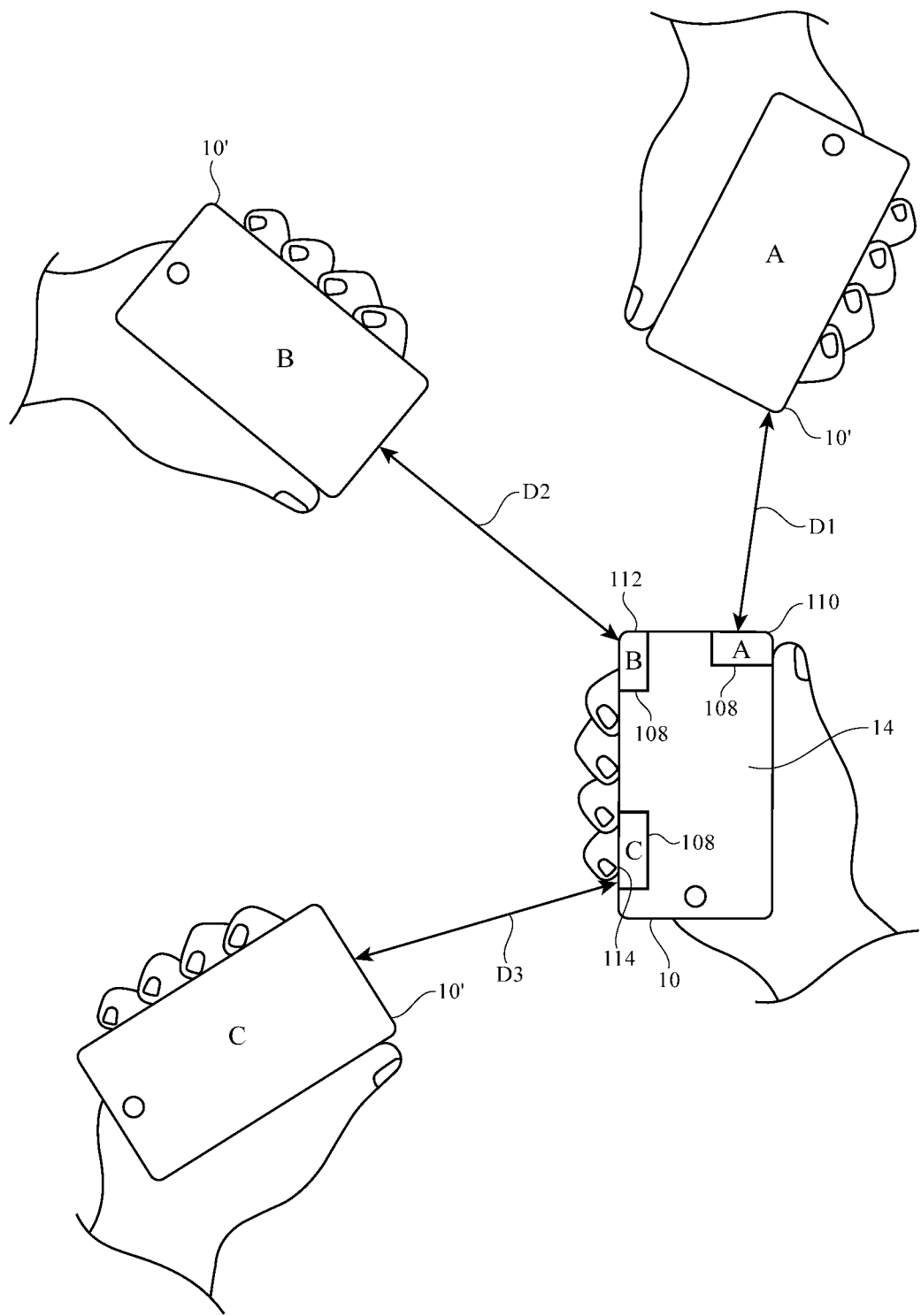
FIG. 15 is a top view of illustrative electronic devices showing how a user may be informed of the position of nearby electronic devices in accordance with an embodiment.

FIG. 15 illustrates an example in which device 10 is operating in an environment where multiple devices are within sufficient range to establish a wireless communications link. Display 14 may present images to show the user of device 10 which devices 10' are nearby and where they are located relative to device 10. This may be done purely with text on display 14 (e.g., device A is 5 feet away, device B is 6 feet away, and device C is 5 feet away) or may be achieved with visual aids on display 14 that help the user more quickly assess which devices are nearby and where they are located relative to device 10. A user may then select which device it wants to exchange information with (e.g., send information to or receive information from) by selecting the appropriate notification 108. In response to receiving user input indicating which device 10' the user of device 10 wishes to exchange information with, control circuitry 22 may establish the wireless communications link with that device 10' (e.g., using wireless transceiver circuitry) so that information can be exchanged over the wireless communications link. If desired, display 14 may display an image of the type shown in FIG. 12 to inform the user that device 10 is wirelessly communicating with the selected device 10'.

As shown in FIG. 15, display 14 may generate a notification such as notification 108 for each device 10' within a given distance of device 10. The locations of notifications 108 on display 14 may correspond to where devices 10' are respectively located relative to device 10 (e.g., where devices 10' are located relative to longitudinal axis 102). For example, device A is closest to top right corner 110 of device 10 and notification 108 for device A may therefore be located on the top right corner of display 14. Device B is closest to top left corner 114 of device 10 and notification 108 for device B may therefore be located on the top left corner of display 14. Device C is closest to the lower left hand side 114 of device 10 and notification 108 for device C may therefore be located on the lower left hand side of display 14. When one of devices 10' moves relative to electronic device 10, control circuitry 22 may change the location of notification 108 on display 14 accordingly. For example, if devices A and B were to switch places, notifications 108 for devices A and B may also switch locations on display 14, if desired.

In addition to having locations on display 14 that clue the user in as to which side of device 10 other devices 10' are located, notifications 108 may provide a visual indication of the proximity of devices 10' to device 10. For example, the color, size, shape, pattern, font, style, or other characteristic of notifications 108 may be adjusted according to distances D1, D2, and D3 between device 10 and devices A, B, and C, respectively. If D1 is smaller than D2, for example, notification 108 for device A may be larger than notification 108 for device B, indicating to the user of device 10 that device A is closer than device B.

Figure 16:
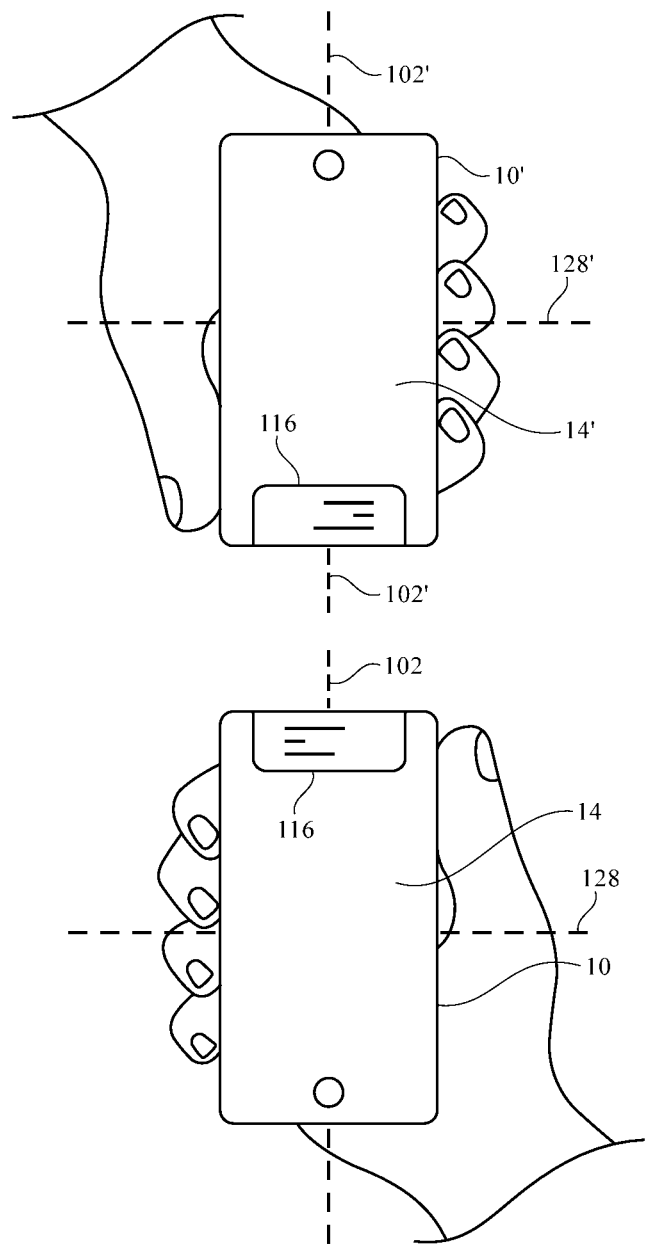
FIG. 16 is a top view of illustrative electronic devices showing how information may be exchanged when the electronic devices are placed next to one another in accordance with an embodiment.

FIG. 16 shows an example in which information such as information 116 is shared between two devices such as device 10 and device 10'. Similar to the example of FIG. 12, a wireless communications link may be established between device 10 and device 10' when device 10' is within a predetermined threshold distance of device 10. In some scenarios, a user may only wish to share information 116 when device 10 is oriented in a particular way relative to device 10'. In other scenarios, it may be desirable to automatically share certain kinds of information 116 when device 10 is oriented in a particular way relative to another device 10.

To address these scenarios, control circuitry 22 may take certain actions when device 10 and device 10' are oriented in a particular way with respect to one another. In the example of FIG. 16, control circuitry 22 takes action with respect to information 116 when longitudinal axes 102 and 102' align (e.g., when the top ends of devices 10 and 10' face one another and the angle between the two axes is less than a predetermined threshold angle.). This is, however, merely illustrative. If desired, control circuitry 22 may take action with respect to information 116 when devices 10 and 10' are arranged side-to-side (e.g., when longitudinal axis 102 and 102' are parallel) or are arranged in any other suitable manner that is intended to trigger the exchange of information 116.

If desired, other axes may be used to determine the orientation of device 10 relative to device 10'. For example, control circuitry 22 may determine where device 10' is located relative to horizontal axis 128 that runs cross-wise through device 10 (e.g., a side-to-side axis that extends between left and right sides of device 10 and is perpendicular to longitudinal axis 102). When horizontal axis 128 is used as a reference, control circuitry 22 may determine the angle between horizontal axis 128 of device 10 and horizontal axis 128' of device 10. Control circuitry 22 may determine that device 10 and device 10' are arranged side-to-side when their horizontal axes align and/or when the angle between the two axes is less than a predetermined threshold angle.

Upon determining that device 10 and device 10' are oriented end-to-end, side-to-side, or other suitable trigger orientation, control circuitry 22 may take suitable action with respect to information 116. This may include, for example, displaying information 116 on display 14 so that a user of device 10 can confirm that the user wishes to send information 116 to device 10', or it may include automatically sending information 116 to device 10'. As an example, information 116 may include contact information. If the user of device 10 wishes to exchange contact information with the user of device 10', the two users may place devices 10 and 10' in the appropriate trigger location (e.g., end-to-end as shown in the example of FIG. 16, side-to-side, or other suitable arrangement). Upon detecting that device 10 and device 10' are in the appropriate trigger location, control circuitry 22 may automatically send contact information 116 to device 10' (or may prompt the user to take action before sending contact information 116 to device 10').

Figure 17:
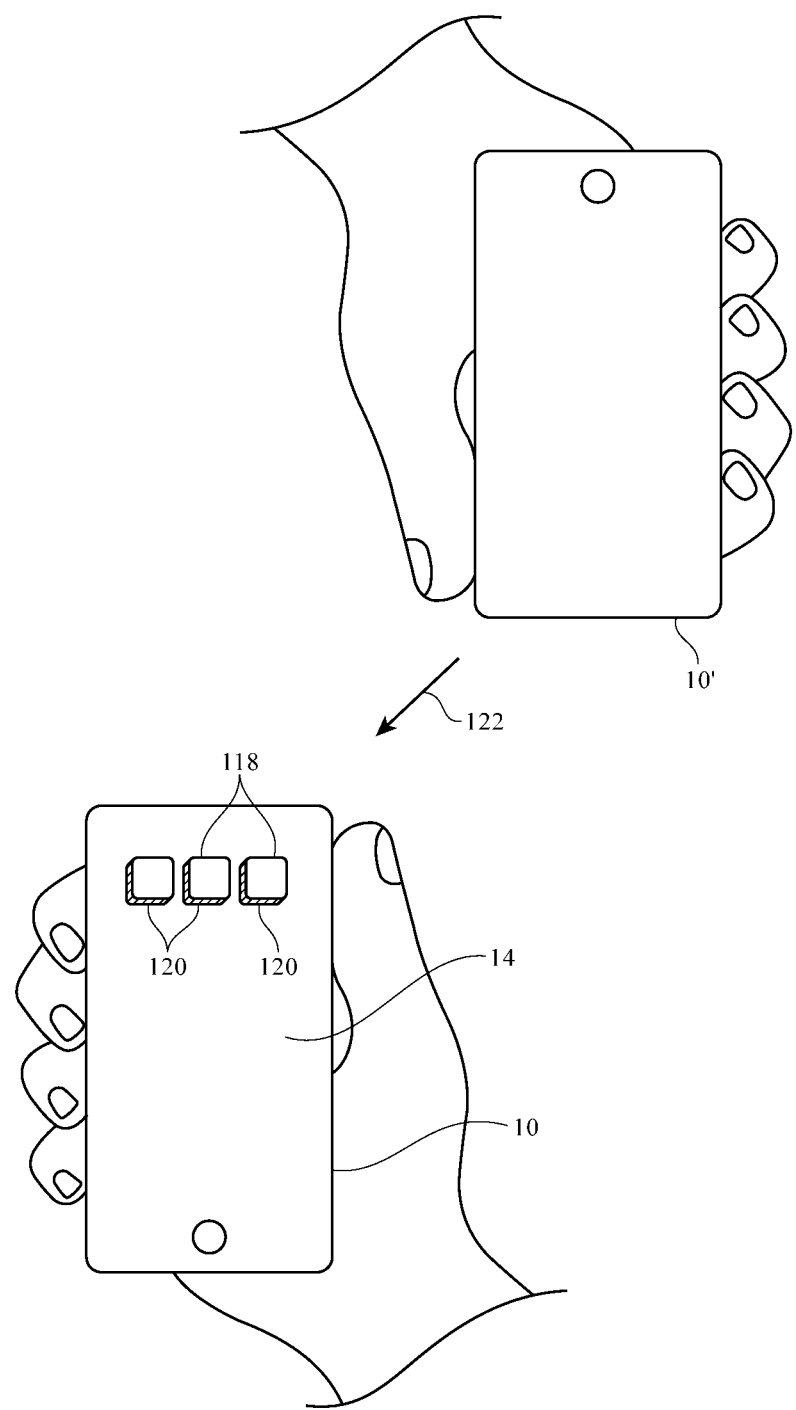
FIGS. 17 and 18 are top views of illustrative electronic devices showing how display elements may be modified based on the position of a nearby electronic device in accordance with an embodiment.
Figure 18:
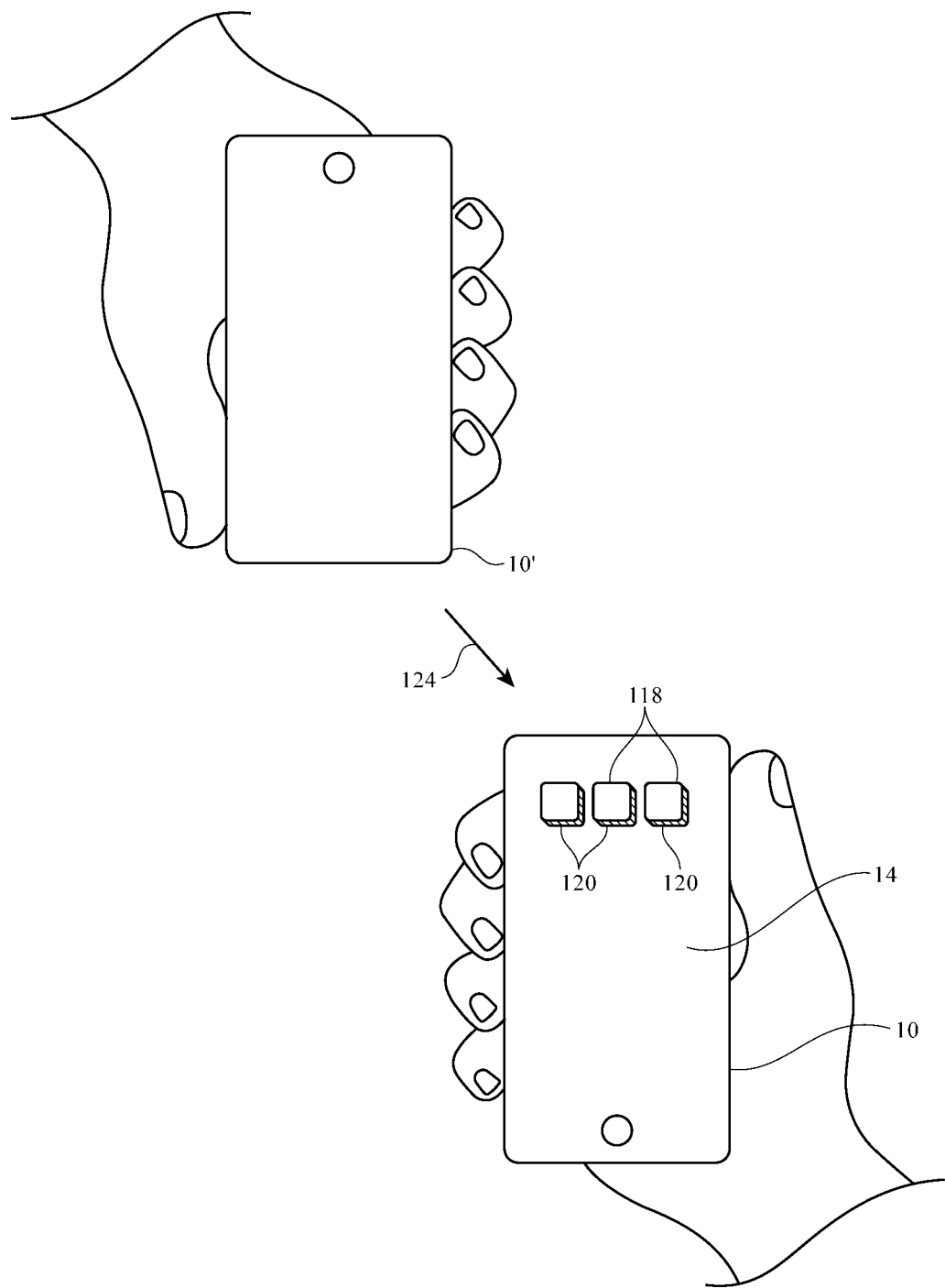

FIGS. 17 and 18 illustrate how device 10 may provide other types of output for a user to inform the user where nearby devices are located relative to device 10. Control circuitry 22 may, for example, adjust user interface elements on display 14 based on where other devices such as device 10' are located relative to device 10. This may include, for example, creating images with shadows on display 14 that clue the user of device 10 in as to where device 10' is located. For example, as shown in FIG. 17, display 14 may have user interface elements 118. Shadows 120 may be displayed on the lower left corner of elements 118 when device 10' is to the right of device 10 (e.g., where device 10' would be casting a shadow in direction 122). As shown in FIG. 18, shadows 120 may be displayed on the lower right corner of element 118 when device 10 is to the left of device 10 (e.g., where device 10' would be casting a shadow in direction 124).

This is, however, merely illustrative. In general, any display change may be used to inform the user of device 10 as to the location of other devices 10' in its vicinity. Display changes may include background changes, icon changes, or other suitable changes (e.g., changes in shape, shade, location, size, or other characteristic of elements on display 14).

The examples of FIGS. 12-18 in which control circuitry 22 uses display 14 to provide a user of device 10 with a visual indication of the presence, location, orientation of, and connection to nearby devices is merely illustrative. If desired, control circuitry 22 may supplement or replace the visual aid of display 14 with audio output from speakers 34, haptic output from one or more vibrators, light-based output from one or more light sources, or other informative output. Similar to how images on display 14 may change location, shape, color, etc. to help inform the user of where nearby devices 10' are located and when wireless communications links are established, output from other output devices may be adjusted to provide this type of information. For example, an audible beeping, a vibration, or a light pulse on the left side of device 10 may indicate the presence, proximity, or wireless communications capabilities of a device 10' on the left hand side of device 10. Any suitable characteristic of the output may be adjusted to alert the user of an approaching device, an established or broken wireless connection, proximity, orientation (e.g., the volume or tone of the audio output, the intensity or frequency of the vibration, the brightness of the light pulse, etc.).

The foregoing is merely illustrative and various modifications can be made to the described embodiments. The foregoing embodiments may be implemented individually or in any combination.

What is claimed is:

1. A method for operating an electronic device having control circuitry, wireless transceiver circuitry, and a display, comprising:
    with the control circuitry, determining an orientation of the electronic device relative to a nearby electronic device;
    with the wireless transceiver circuitry, establishing a wireless communications link between the electronic device and the nearby electronic device and sending information to the nearby electronic device in response to determining the orientation of the electronic device relative to the nearby electronic device; and
    with the display, displaying an image that indicates a status of the wireless communications link and the orientation of the electronic device relative to the nearby electronic device.

2. The method defined in claim 1 further comprising determining a distance between the nearby electronic device and the electronic device.

3. The method defined in claim 2 wherein the electronic device has a longitudinal axis and wherein determining the orientation of the electronic device relative to the nearby electronic device comprises determining whether the longitudinal axis is pointing towards the nearby electronic device.

4. The method defined in claim 3 further comprising a motion sensor that gathers motion sensor data, wherein the control circuitry determines the orientation of the electronic device relative to the nearby electronic device at least partially based on the motion sensor data.

5. The method defined in claim 3 wherein the longitudinal axis of the electronic device is a first longitudinal axis, wherein the nearby electronic device has a second longitudinal axis, and wherein determining the orientation of the electronic device relative to the nearby electronic device comprises determining an angle between the first and second longitudinal axes.

6. The method defined in claim 1 wherein the image comprises a line that extends toward the nearby electronic device.

7. The method defined in claim 6 further comprising:
    with the control circuitry, detecting movement of the nearby electronic device; and
    with the display, moving a location of the line on the display based on the movement of the nearby electronic device.

8. The method defined in claim 1 wherein displaying an image that indicates the status of the wireless communications link comprises displaying a broken line when the communications link is no longer established.

9. The method defined in claim 1 wherein the electronic device has a longitudinal axis and wherein determining the orientation of the electronic device relative to the nearby electronic device comprises determining an orientation of the longitudinal axis of the electronic device relative to the nearby electronic device.

10. The method defined in claim 1 wherein determining the orientation of the electronic device relative to the nearby electronic device comprises determining whether the electronic device is pointing towards the nearby electronic device.

11. The method defined in claim 10 wherein establishing the wireless communications link between the electronic device and the nearby electronic device comprises automatically establishing the wireless communications link between the electronic device and the nearby electronic device in response to determining that the electronic device is pointed towards the nearby electronic device.

12. A method for operating an electronic device having control circuitry, wireless transceiver circuitry, and a display, comprising:
    with the control circuitry, determining a first location of a first electronic device relative to the electronic device and a second location of a second electronic device relative to the electronic device;
    with the display, displaying an image that includes a first notification of a first size representative of the first location and a second notification of a second size representative of the second location, wherein the first size is different from the second size and wherein the first and second sizes are based on the respective first and second locations of the first and second electronic devices;
    with the wireless transceiver circuitry, establishing a wireless communications link with one of the first and second electronic devices.

13. The method defined in claim 12 wherein determining the first and second locations comprises determining that the first electronic device is a first distance from the electronic device and the second electronic device is a second distance from the electronic device, wherein the first distance is less than the second distance, and wherein the first notification is larger than the second notification.

14. The method defined in claim 12 wherein a location of the first notification on the display is based on the first location of the first electronic device and wherein a location of the second notification on the display is based on the second location of the second electronic device.

15. The method defined in claim 14 further comprising:
    with the control circuitry, detecting movement of the first electronic device; and
    with the display, moving the first notification on the display in response to the movement of the first nearby electronic device.

16. The method defined in claim 12 further comprising:
    with the display, receiving user input corresponding to a selection of the first notification, wherein establishing the wireless communications link with one of the first and second electronic devices comprises establishing the wireless communications link with the first electronic device in response to the user input.

17. A method for operating a first electronic device having control circuitry and wireless transceiver circuitry, comprising:
    with the control circuitry, determining that a distance between the first electronic device and a second electronic device is less than a predetermined threshold distance;
    with the control circuitry, determining that an angle between a first axis associated with the first electronic device and a second axis associated with the second electronic device is less than a predetermined threshold angle;

in response to determining that the distance is less than the predetermined threshold distance and that the angle is less than the predetermined threshold angle, exchanging information with the second electronic device using the wireless transceiver circuitry; and with the control circuitry, terminating a wireless communications link between the first and second electronic devices in response to determining that the angle is greater than the predetermined threshold.

18. The method defined in claim 17 further comprising:
with a display in the first electronic device, displaying an image corresponding to the information to be exchanged with the second electronic device.

19. The method defined in claim 17 wherein the first axis comprises a longitudinal axis that extends from one end of the first electronic device to an opposing end of the first electronic device and wherein the second axis comprises a longitudinal axis that extends from one end of the second electronic device to an opposing end of the second electronic device.

20. The method defined in claim 19 wherein determining that the distance is less than the predetermined threshold distance and that the angle is less than the predetermined threshold angle comprises determining that the first and second electronic devices are arranged end-to-end.

21. The method defined in claim 19 wherein determining that the distance is less than the predetermined threshold distance and that the angle is less than the predetermined threshold angle comprises determining that the first and second electronic devices are arranged side-to-side.

22. The method defined in claim 17 wherein the first axis comprises an axis that extends from a left side of the first electronic device to an opposing right side of the first electronic device and wherein the second axis comprises an axis that extends from a left side of the second electronic device to an opposing right side of the second electronic device.

* * * * *